(12) United States Patent
Toshihiko

(10) Patent No.: US 6,505,836 B1
(45) Date of Patent: Jan. 14, 2003

(54) NON-CONTACT TYPE SHAFT SEALING DEVICE

(75) Inventor: Fuse Toshihiko, Sanda (JP)

(73) Assignee: Nippon Pillar Packing Co., LTD, Osaka (JP)

( * ) Notice: Subject to any disclaimer, the term of this patent is extended or adjusted under 35 U.S.C. 154(b) by 0 days.

(21) Appl. No.: 09/762,552

(22) PCT Filed: Jun. 7, 1999

(86) PCT No.: PCT/JP99/03037

§ 371 (c)(1),
(2), (4) Date: Jun. 4, 2001

(87) PCT Pub. No.: WO00/75540

PCT Pub. Date: Dec. 14, 2000

(51) Int. Cl.⁷ ................................................. F16J 15/34
(52) U.S. Cl. ........................ 277/400; 277/408; 277/411
(58) Field of Search ................................ 277/400, 408, 277/411

(56) References Cited

U.S. PATENT DOCUMENTS

| | | | |
|---|---|---|---|
| 5,443,274 A | * | 8/1995 | Fuse |
| 6,135,458 A | * | 10/2000 | Fuse ..................... 277/400 X |
| 6,145,840 A | * | 11/2000 | Pope ..................... 277/400 X |
| 6,325,378 B1 | * | 12/2001 | Okumachi et al. ...... 277/408 X |

FOREIGN PATENT DOCUMENTS

| | | | |
|---|---|---|---|
| JP | 2-146374 | * | 6/1990 |
| JP | 9-196185 | * | 7/1997 |
| JP | 9-303571 | * | 11/1997 |

* cited by examiner

*Primary Examiner*—Anthony Knight
*Assistant Examiner*—Karlena D. Schwing
(74) *Attorney, Agent, or Firm*—Eric B. Meyertons

(57) ABSTRACT

A non-contact type shaft sealing device comprising a stationary sealing ring (9) disposed to axially oppose a rotational sealing ring (2) provided on a rotational shaft (1) of a device that will be shaft-sealed, wherein a number n of air inlets (9b) provided in the stationary sealing ring (9) is in a range of 3 to 24; a bore diameter d of a throttling mechanism provided in each of the air inlets (9b) is in a range of 0.05 to 3 mm; and concurrently, a dimensionless quantity α defined as $$\alpha = 8\ hD/nd^2$$

where h=inter-sealing-surface gap, and
 D=shaft diameter, is $1 \leq \alpha \leq 200$. Thereby, ensuring stable sealing characteristics in the non-contact type shaft sealing device, and furthermore, minimizing consumption of a barrier gas to be fed through the air inlets (9b).

4 Claims, 1 Drawing Sheet

NON-CONTACT TYPE SHAFT SEALING DEVICE

TECHNICAL FIELD

The embodiment described herein relates to a non-contact type shaft sealing device for sealing a space between a rotational shaft and a housing of a device that will be shaft-sealed, such as a turbine, a blower, a compressor, an agitator, or a rotary valve.

BACKGROUND ART

A non-contact type shaft sealing device of the aforementioned type is disclosed in publications, for example, a Japanese Unexamined Patent Application Publication No. 4-171370. Hereinbelow, an example device of this type will be described with reference to FIGS. 1 and 2. In FIG. 1, reference numeral 1 denotes a rotational shaft of a device that will be shaft-sealed. A rotational seal ring 2 is hermetically fitted about the rotational shaft 1. A fixing-side seal unit 5 is connected to a housing 4 of the device that will be shaft-sealed. In the unit 5, a stationary sealing ring 9 is disposed to face the rotational sealing ring 2 in the axial direction. Mutually opposing surfaces of the stationary sealing ring 9 and the rotational sealing ring 2 are formed as sealing surfaces 9s and 2s.

On the opposite side of the sealing surface 9s of the stationary sealing ring 9, springs 11 for urging the stationary sealing ring 9 toward the rotational sealing ring 2 are provided. The stationary sealing ring 9 has air inlets 9b formed from a peripheral surface thereof so as to reach the sealing surface 9s. Through the air inlets 9b, a barrier gas, such as a nitrogen gas, is supplied from an outside source to the sealing surface 9s.

Orifices 12 are provided in the air inlets 9b to reduce variations in supply pressure of the barrier gas. In addition, as shown FIG. 2, the sealing surface 9s has a plurality of, for example, six arcuate pocket grooves 9c formed at identical pitches along a circle line extending substantially along the center between the inner and outer peripheries. Each of the air inlets 9b opens at a circumferentially central portion of each of the pocket grooves 9c. Thus, in the configuration shown in the drawings, the six air inlets 9b each containing the orifice 12 are formed in the stationary sealing ring 9.

In the structure as described above, the barrier gas supplied from an outside source is throttled by the orifices 12, and is then fed to the individual pocket grooves 9c through the air inlets 9b. The gas is led to pass through the gap between the sealing faces 2s and 9s (which will be referred to as an inter-sealing-surface gap, hereinbelow) of the respective rotational sealing ring 2 and the stationary sealing ring 9. Then, the gas flows out of the pocket grooves 9c toward the inner and outer peripheries. At this time, a gas pressure is built on the inter-sealing-surface gap, and it works as a force that presses the stationary sealing ring 9 in the opening direction (leftward in the drawing). The stationary sealing ring 9 is held at the position where the aforementioned gas-pressure force antagonizes spring forces exerted by the springs 11 (specifically, the spring forces include axial pressing forces of internal gas pressures). Accordingly, the stationary sealing ring 9 is held in the state of non-contacting the rotational sealing ring 2. Thus, shaft-sealing can be implemented using the barrier gas that fills the space between the sealing faces 2s and 9s.

When the inter-sealing-surface gap in the force-antagonized state is widen because of mechanical vibrations or the like, an open-directional force is reduced to thereby move the stationary sealing ring 9 in the direction where the inter-sealing-surface gap is narrowed. In contrast, when the inter-sealing-surface gap is narrowed, the stationary sealing ring 9 moves in the direction where the inter-sealing-surface gap is widened. That is, the device has a self gap-adjusting function.

The pressure in the inter-sealing-surface gap increases in proportion to an increase in the number of the air inlets 9b and in the orifice diameter. Therefore, the sealed condition described above can be more secure in proportion to the increase. However, the increase widens the inter-sealing-surface gap. In order that the self gap-adjusting function works even more favorably, the device is manufactured by setting the inter-sealing-surface gap in a range that allows a quick corrective operation to be performed in response to a variation in the gap.

The conventional non-contact type shaft sealing device manufactured as described above, however, consumes an increased amount of the barrier gas. Therefore, the device has a problem in that it is not sufficient to provide economic advantages. That is, for the device manufactured only in consideration of the improvement in sealing characteristics, the number of the air inlets 9b and the bore diameter of each of the orifices must be increased to be excessively large. This results in the increase of barrier-gas consumption, reducing economical characteristics. To narrow the inter-sealing-surface gap, stronger springs 11 must be disposed behind the stationary sealing ring 9. In this case, however, the barrier-gas pressure distribution on the inter-sealing-surface gap can vary greater. Furthermore, the bore diameters of the air inlets 9b and the orifices 12 must also be checked and must be changed to be suitable.

Thus, conventional devices are not structured sufficient to provide economical advantages in barrier-gas consumption. Although there are devices structured in consideration of this problem, designing and manufacturing procedures thereof are complicated.

The embodiment disclosed herein is made in view of the above-described problems with the conventional cases. Accordingly, an advantage of the embodiment is to provide a non-contact type shaft sealing device that allows barrier-gas consumption to be minimized, thereby providing economical advantages.

DISCLOSURE OF INVENTION

A non-contact type shaft sealing device described herein comprises a stationary sealing ring disposed to axially oppose a rotational sealing ring provided on a rotational shaft of a device that will be shaft-sealed, and urging means for pressing the stationary sealing ring toward the rotational sealing ring, wherein a barrier gas is fed to space between mutually-facing sealing surfaces of the stationary sealing ring and the rotational sealing ring via a plurality of air inlets formed in the stationary sealing ring. The non-contact type shaft sealing device has a number n of the air inlets in a range of 3 to 24; a bore diameter d of a throttling mechanism provided in each of the air inlets in a range of 0.05 to 3 mm; and a dimensionless quantity α defined as $$\alpha = 8\ hD/nd^2$$

where, h=inter-sealing-surface gap, and
D=shaft diameter,
in the range of $1 \leq \alpha \leq 200$.

The dimensionless quantity α represents the relationship among the number n of the air inlets provided in the stationary sealing ring, the bore diameter d of the throttling mechanism formed of either an orifice or a drilled opening which is provided in each of the air inlets, and the amount of gas leaking through the sealing surfaces. By setting the dimensionless quantity α to be within the aforementioned range, the non-contact type shaft sealing device, in which stabled sealing characteristics are ensured, and barrier-gas consumption is minimized, is provided.

When the dimensionless amount α is $15 \leq \alpha \leq 160$, the device is further improved in characteristics regarding sealing performance and barrier-gas consumption. Furthermore, when the shaft diameter D is in a range of 10 to 500 mm, the aforementioned sealing characteristics and the barrier-gas consumption characteristics can be even more securely obtained.

BEST MODE FOR CARRYING OUT THE INVENTION

Figure 1:
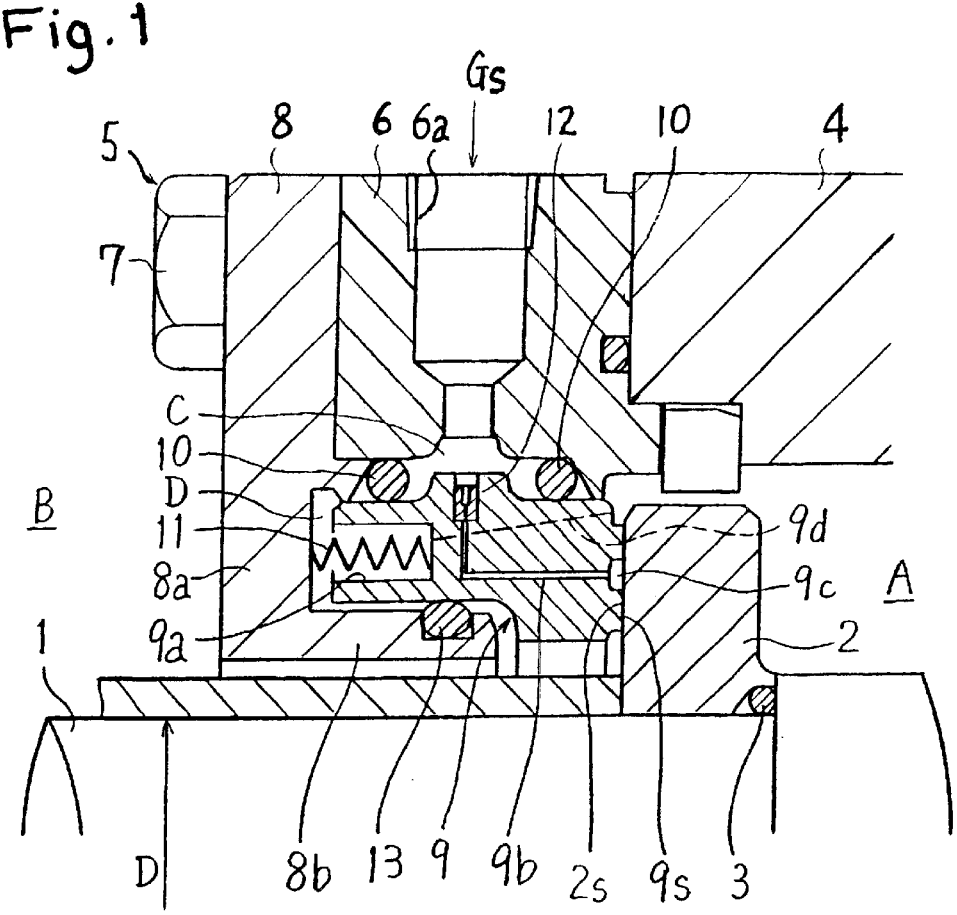
FIG. 1 is a half-portion cross-sectional view of the construction of a non-contact type shaft sealing device according to an embodiment of the present invention.

Hereinbelow, referring to the drawings, a practical embodiment will be described in detail.

FIG. 1 shows an example construction of a non-contact type shaft sealing device according to the present embodiment. In this drawing, reference numeral 1 denotes a rotational shaft, and a rotational sealing ring 2 is immobilized on the rotational shaft 1. The rotational sealing ring 2 has the shape of a flange that projects in the radial direction. An O-ring 3 is disposed between a peripheral surface of the rotational sealing ring 2 and the rotational shaft 1. The O-ring 3 is used as a seal for the portion between a device-interior side A and a device-exterior side B.

A fixing-side seal unit 5 is connected to an end surface of a housing 4 of the device that will be shaft-sealed, the housing 4 enclosing the rotational shaft 1. The fixing-side seal unit 5 is configured of a ring-like gas-feed section 6, an end plate 8 fixed with a bolt 7 to the housing 4, and a stationary sealing ring 9 disposed in the gas-feed section 6. The gas-feed section 6 is thus supported between an end surface of the housing 4 and the end plate 8.

The gas-feed section 6 has a gas-feed opening 6a extending in the radial direction of the device. O-rings 10 are disposed on the two sides that axially sandwiching the gas-feed section 6 between an inner peripheral surface of the gas-feed opening 6a and an outer peripheral surface of the stationary sealing ring 9. A manifold space C is formed between the inner peripheral surface of the gas-feed section 6, which is located between the O-rings 10, and an outer surface of the stationary sealing ring 9. The gas fed through the gas-feed opening 6a is thereby led to flow into the manifold space C.

The end plate 8 includes a spring-retainer section 8a that is unitarily formed to face a rear end surface (left end surface in the drawing) of the stationary sealing ring 9 in the internal, radial direction of the device. On the other hand, a plurality of spring insertion openings 9a are formed to be concave in the radial, axial direction on a rear end surface of the stationary sealing ring 9. Springs 11 (urging means) each formed of a pressing coil spring are individually inserted in the spring insertion openings 9a. Each of the springs 11 is disposed in a depression state such that the rear end thereof abuts the spring-retainer section 8a, and it produces a force forwardly urging the stationary sealing ring 9.

The stationary sealing ring 9 has a plurality of air inlets 9b peripherally formed at identical pitches. Each of the air inlets 9b is formed through the stationary sealing ring 9 substantially in the shape of a letter L, thereby allowing the manifold space C to communicate with a front end surface (right end surface in the drawing) of the stationary sealing ring 9.

On front end sides of the air inlets 9b, pocket grooves 9c are formed, each having a predetermined width in the radial direction and opening on the stationary sealing ring 9. On the other hand, an orifice 12 is formed as a throttling mechanism in each of the air inlets 9b on the side of the manifold space C.

On the side in the internal, radial direction of the end plate 8, a columnar section 8b extending forward is unitarily formed close to the periphery of the rotational shaft 1. An O-ring 13 is disposed between an outer peripheral surface of the columnar section 8b and an inner peripheral surface of the stationary sealing ring 9. The stationary sealing ring 9 is supported by the O-ring 13 and the O-rings 10 placed at two sides of the manifold space C. In this manner, the stationary sealing ring 9 is structured to be movable backward along the axial direction according to the spring forces exerted by the springs 11.

Figure 2:
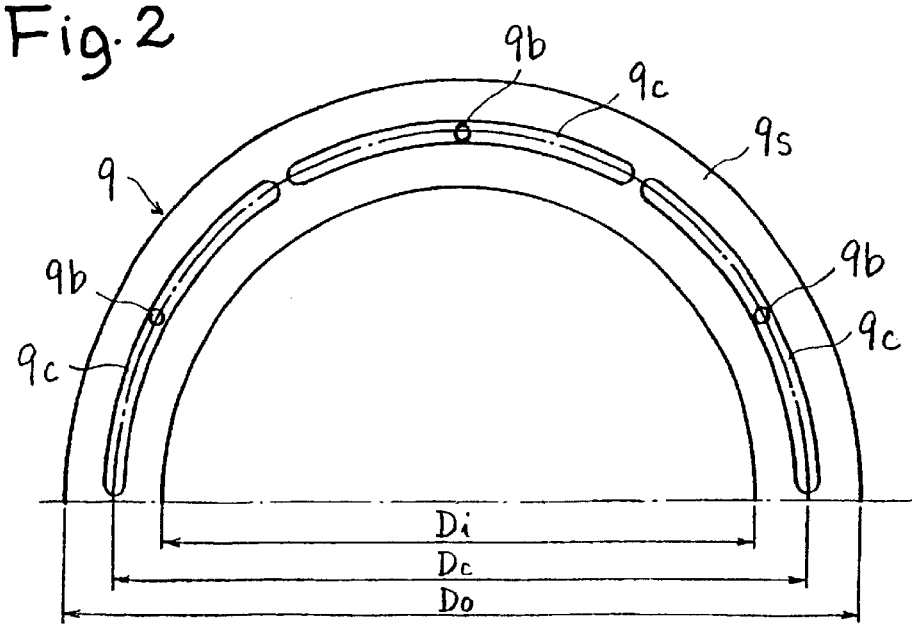
FIG. 2 is an end view showing a sealing face of a stationary sealing ring in the aforementioned device.

As shown in FIG. 2, the front end surface (which will be referred to as a sealing surface 9s, hereinbelow) of the stationary sealing ring 9, which faces the rotational sealing ring 2, is formed to have a predetermined width. The pocket grooves 9c are formed along a circle line extending along substantially the center of the outer surface and the inter surface. In the case shown in the drawing, the pocket grooves 9c are formed at six divisional portions in the peripheral direction. Each of the air inlets 9b is formed to open at a central portion in the peripheral direction of each of the pocket grooves 9c. In this case, six air inlets 9b are formed in the stationary sealing ring 9 to allow the individual pocket grooves 9c to communicate with the manifold space C.

In the stationary sealing ring 9, as shown by a dotted line in FIG. 1, through-holes 9d are formed that extend to the spring insertion openings 9a from shoulder portions on a front-end periphery side, where the stationary sealing ring 9 is exposed to the device-interior side A. A space D on a rear end side of the stationary sealing ring 9, which includes inner spaces of the spring insertion openings 9a is sealed such that an exterior side thereof is sealed by the left O-ring 10, and an interior side thereof is sealed by the O-ring 13. The interior gas flows into the space D through the through-holes 9d. Thereby, the interior gas works to press the stationary sealing ring 9 in the axial direction. According to this configuration, the force exerting on the front end side of the stationary sealing ring 9 to press it backward (the force will be referred to as an interior-gas opening force, hereinbelow) is substantially balanced with a force caused by a flow of the gas into the hermetic space D (the force will be referred to as an interior-gas shutting-off force, hereinbelow).

In the non-contact type shaft sealing device configured as described above, a barrier gas Gs, such as an N$_2$ gas, is fed into the gas-feed opening 6a from an outside source. The barrier gas Gs flows from the manifold space C into the air inlets 9b, and is then fed into the pocket grooves 9c through the air inlets 9b. A gas pressure generated in each of the pocket grooves 9c is thereby combined with the interior-gas opening force. As a result, the stationary sealing ring 9 opposes a combined force of spring forces of the springs 11 and the interior-gas shutting-off force, thereby moving backward (the combined force will be referred to as a shut-off-directional combined force). Accordingly, the sealing surface 9s moves away from an opposing end surface of the rotational sealing ring 2 (the end face will be referred to as a sealing surface 2s, hereinbelow). Thereby, a flow of the barrier gas Gs, which has been fed into the pocket grooves 9c, is caused and is led to the inner-peripheral side and the outer peripheral side through the space between the sealing surfaces 9s and 2s, that is, through the inter-sealing-surface gap.

In the above-described gas-flowing state, the stationary sealing ring 9 is moved backward and is held at a position where a combined pressure of a pressure of the barrier gas Gs in the inter-sealing-surface gap and an interior-gas opening force (the combined force will be referred to as an open-directional combined force, hereinbelow) antagonizes the aforementioned shut-off-directional combined force. The barrier gas Gs filled in the inter-sealing-surface gap shut off the communication made between the interior side and the exterior side via the inter-sealing-surface gap. As a result, a sealed condition in which the stationary sealing ring 9 is in contact with the rotational sealing ring 2 can be obtained. The sealed condition is maintained to thereby rotationally drive the rotational shaft 1 and the rotational sealing ring 2.

When the inter-sealing-surface gap in the force-antagonized state, as described above, is widen because of mechanical vibrations or the like, the open-directional combined force is reduced to thereby move the stationary sealing ring 9 in the direction where the inter-sealing-surface gap is narrowed. In contrast, when the inter-sealing-surface gap is narrowed, the stationary sealing ring 9 moves in the direction where the inter-sealing-surface gap is widened. That is, the device has a self gap-adjusting function.

The pressure in the inter-sealing-surface gap increases in proportion to an increase in the number of the air inlets 9b and in the bore diameter of each of the orifices 12 (which will be referred to as an orifice diameter, hereinbelow). Accordingly, the sealed condition described above can be more secure in proportion the increase. However, the increase widens the inter-sealing-surface gap. In order that the self gap-adjusting function works even more favorably, the inter-sealing-surface gap needs to be set in a range that allows the above-described movement of the stationary sealing ring 9 to be quickly performed in response to a variation in the gap, that is, to be performed at high sensitivity. As an additional measure, since the amount (consumption) of the barrier gas Gs leaking through the inter-sealing-surface gap increases in proportion to the increase in the inter-sealing-surface gap, the number of the air inlets 9b and the orifice diameter in the non-contact type shaft sealing device of the present embodiment are set as described below to reduce the barrier-gas consumption.

Specifically, suppose the pressure of barrier gas to be fed to the stationary sealing ring 9 is in the range of plus 1 to 3 bar of an interior-gas pressure, and the pressure of the barrier gas at the radial center between the sealing faces is in the range of plus 0.5 to 1.5 bar of the interior-gas pressure. In this case, a number n of the air inlets 9b is set to the range of 3 to 24, and a bore diameter d of the orifice is set to the range of 0.05 to 3.0 mm. Concurrently, setting is made so that a dimensionless quantity α shown in the following Equation (1) is $1 \leq \alpha \leq 200$.

$$\alpha = 8\ hD/(nd^2) \qquad \text{Equation (1)}$$

where: h=inter-sealing-surface gap
D=rotational-shaft diameter.

The above dimensionless quantity α corresponds to the ratio between a total area So of openings at the inner-peripheral side and the outer peripheral side of the inter-sealing-surface gap, and a total cross-sectional area Si of the orifice bores. Specifically, using individual diameters Di and Do, So is expressed as $$So = \pi Di \times h + \pi Do \times h$$
$$= \pi h(Di + Do)$$
$$= \pi h \times 2Dc;$$

and Si is expressed as $$Si = n \times (\pi d^2/4).$$

According to the above, a ratio α' therebetween is expressed as $$\alpha' = \pi h \times 2\ Dc/[n \times \pi d^2/4] = 8\ hDc/nd^2.$$

In this case, the diameter Dc of a circle line extending along the center of the sealing surface 9s of the stationary sealing ring 9 is a value set to the dimension corresponding to the diameter D of the rotational shaft 1. Accordingly, when Dc is replaced with D, the dimensionless amount α is defined as shown in the above Equation (1).

As described above, the dimensionless quantity α represents the relationship among the number n of the air inlets 9b, the bore diameter d of each of the orifices 12 disposed therein, and the amount of gas leaking from the inter-sealing-surface gap. The non-contact type shaft sealing device of the present embodiment is manufactured in a procedure incorporating the above-described dimensionless amount α.

Specifically, the amount of the barrier gas Gs to be supplied is determined by the number of the air inlets 9b and the bore diameter d of each of the orifices 12 disposed therein, and the total amount of the supply gas leaks from the inter-sealing-surface gap to interior and exterior radial directions. The amount of gas leakage is proportional to the total area of openings at the inner-peripheral side and the outer peripheral side of the inter-sealing-surface gap.

To maintain the pressure at the center of the sealing surfaces higher than a predetermined value by using the supply gas, the amount of gas leaking through the inter-sealing-surface gap must be larger than gas to be supplied. Therefore, restriction is required for the total opening area of the inter-sealing-surface gap.

In view of the above, the above-described dimensionless quantity α is set in the range of 1 to 200. Thereby, the non-contact type shaft sealing device can be manufactured to have stable sealing functions by which the sealing surfaces are kept in non-contact with each other, the interior gas is prevented from leaking to the atmosphere, and in addition, the barrier-gas consumption is minimized.

Table 1 shows the correlations between α's and consumptions of the barrier gas Gs in non-contact type shaft sealing devices that are different from each other regarding the number n of air inlets and the bore diameter d of each of orifices individually provided in the air inlets.

In Comparative Example 1 and each of Examples 1 to 4 shown in the table, the shaft diameter D is 250 mm. They were formed to have the number of air inlets and the orifice bore diameter d that are varied. Also, inter-sealing-surface gaps h were set corresponding thereto to allow the self gap-adjusting function to work favorably. In Comparative Example 1, however, α is less than 1. In this case, since the inter-sealing-surface gap is excessively increased, gas consumption is excessively increased. In each of Examples 1 to 4 in which α is greater than 1, the greater α is, the less gas consumption is maintained. Particularly, in each of Examples 2 to 4 in which α is greater than 15, compared to Example 1, the value of gas consumption is decreased significantly by a two-digit or larger integer.

When α exceeds 200 as in Comparative Example 2, although gas consumption is further decreased, the inter-sealing-surface gap h is reduced equal to 5 μm or less. In this case, only by slight changes in, for example, the parallelism of the sealing surface 9s of the stationary sealing ring 9 and the sealing surface 2s of the rotational sealing ring 2, the sealing surfaces 9s and 2s approach so as to be in contact with each other. From this point of view, a should be set in a range of 200 to a smaller value; or preferably, it should be set in a range of 160 to a smaller value.

Example 5 is a device of specifications different in the barrier-gas supply pressure from those of the above cases. Also in this case, since α is in the abovementioned range, gas consumption is sufficiently reduced.

Comparative Example 3 and Examples 6 and 7 are devices, in which the shaft diameter D is 45 mm. Similarly to the above, compared to Comparative Example 3 in which α is less than 1, gas consumption is sufficiently reduced in each of Examples 6 and 7.

As described above, the non-contact type shaft sealing device of the embodiment disclosed herein is manufactured such that the number n of the air inlets 9b is in the range of 3 to 24; the bore diameter of each of the orifices is in the range of 0.05 to 3.0 mm; and in addition, the above-defined dimensionless amount α is $1 \leq \alpha \leq 200$. Thereby, stable sealing characteristics are ensured, and in addition, barrier-gas consumption is minimized to allow economic advantages to be obtained.

The present invention is not limited to the above embodiment, and various modifications may be made within the scope of the invention. For example, the above mode and embodiments have been described with reference to the non-contact type shaft sealing devices as an example in which the orifice 12 to be provided as a throttling mechanism in each of the air inlets; however, the invention may be applied to a device in which the throttling mechanism is formed of a drilled opening.

What is claimed is:

1. A non-contact type shaft sealing device comprising: a stationary sealing ring disposed to axially oppose a rotational sealing ring provided on a rotational shaft of a device that will be shaft-sealed; an urging means for pressing said stationary sealing ring toward said rotational sealing ring, wherein a barrier gas is fed to an inter-sealing-surface gap between mutually-facing sealing surfaces of said stationary sealing ring and said rotational sealing ring via a plurality of air inlets formed in said stationary sealing ring; a number n of said air inlets is in a range of 3 to 24; a bore diameter d of a throttling mechanism provided in each of said air inlets is in a range of 0.05 to 3 mm; and a dimensionless quantity α defined as $$\alpha = 8\ hD/nd^2$$

wherein, h=the inter-sealing-surface gap, and
D=shaft diameter,
is $1 \leq \alpha \leq 200$ thereby when α is set in this range a stable sealing characteristic is ensured and barrier gas consumption is minimized.

2. The device of claim 1, where the dimensionless quantity α is $15 \leq \alpha \leq 160$.

3. The device of claims 1, where the shaft diameter D is in a range of 10 to 500 mm.

4. The device of claims 2, where the shaft diameter D is in a range of 10 to 500 mm.

* * * * *

TABLE 1

|  | Gas Supply Pressure bar | Spring Force kgf | Shaft Diameter mm | No. of Air Inlets | Orifice Bore Diameter mm | Inter-Sealing-Surface Gap μm | α | Gas Consumption l/min |
|---|---|---|---|---|---|---|---|---|
| Comparative Example 1 | 2 | 150 | 250 | 24 | 3 | 65 | 0.6 | 5266 |
| Example 1 | 2 | 150 | 250 | 4 | 3 | 36.2 | 2.0 | 877 |
| Example 2 | 2 | 92 | 250 | 8 | 0.5 | 18.2 | 18.2 | 57 |
| Example 3 | 2 | 92 | 250 | 8 | 0.3 | 12.9 | 35.8 | 20.6 |
| Example 4 | 2 | 50 | 250 | 12 | 0.1 | 9.0 | 150.5 | 5.4 |
| Comparative Example 2 | 2 | 92 | 250 | 4 | 0.1 | 4.9 | 245.0 | 1.1 |
| Example 5 | 4 | 92 | 250 | 12 | 0.3 | 10.0 | 18.4 | 34 |
| Comparative Example 3 | 2 | 14 | 45 | 6 | 2 | 41 | 0.6 | 553 |
| Example 6 | 2 | 14 | 45 | 3 | 1 | 20.7 | 2.5 | 69 |
| Example 7 | 2 | 8 | 45 | 3 | 0.3 | 12.4 | 16.5 | 6.4 |